July 2, 1940.  F. C. WERNER  2,206,313
SANDWICH COOKY MACHINE
Filed Nov. 1, 1939  7 Sheets-Sheet 1

INVENTOR.
FRANK CHARLES WERNER
BY Thomas G. Boman.
ATTORNEY.

FIG. 2.

July 2, 1940.　　　　F. C. WERNER　　　　2,206,313
SANDWICH COOKY MACHINE
Filed Nov. 1, 1939　　　　7 Sheets-Sheet 4

INVENTOR.
FRANK CHARLES WERNER
BY
Thomas G. Boman
ATTORNEY.

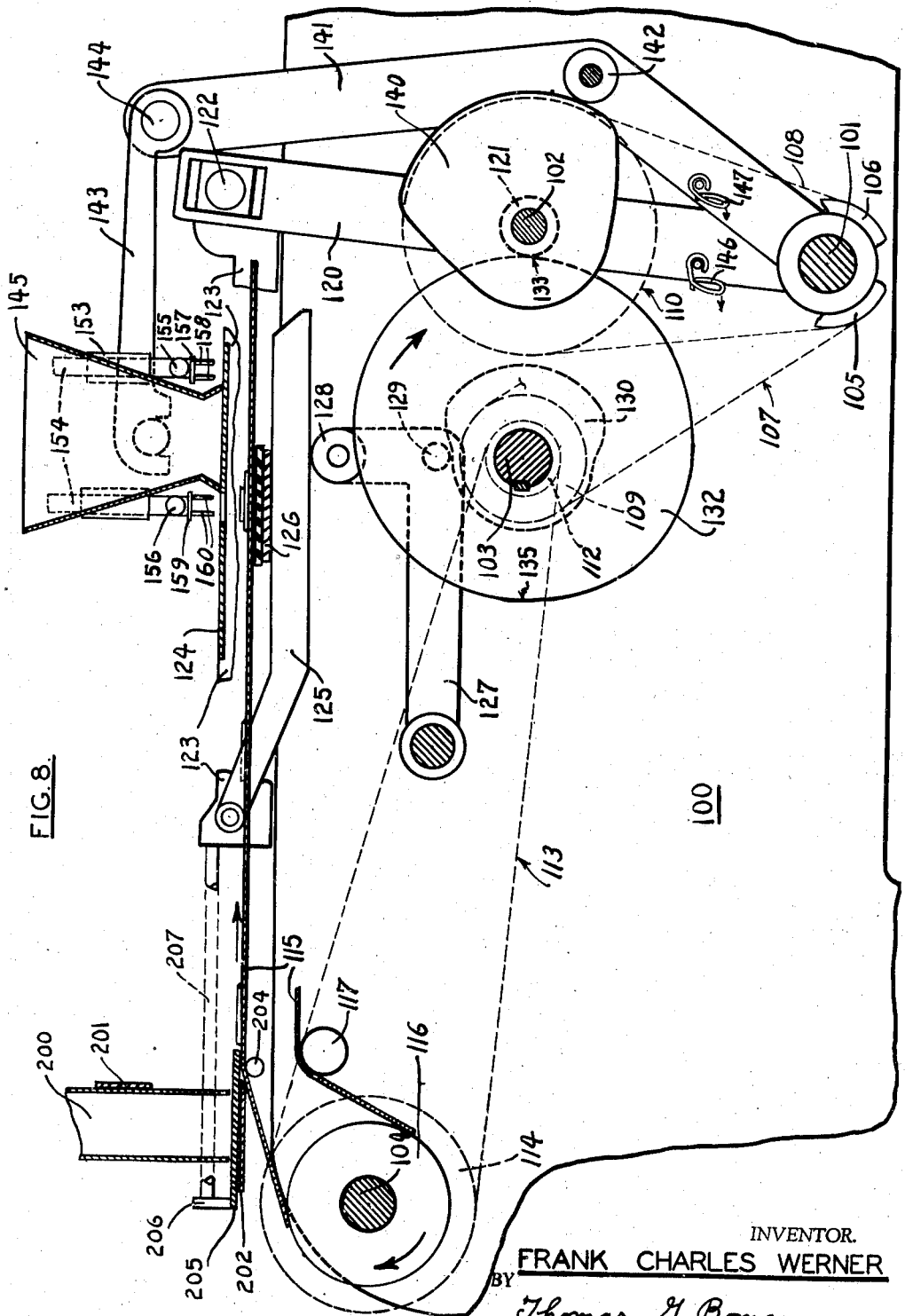

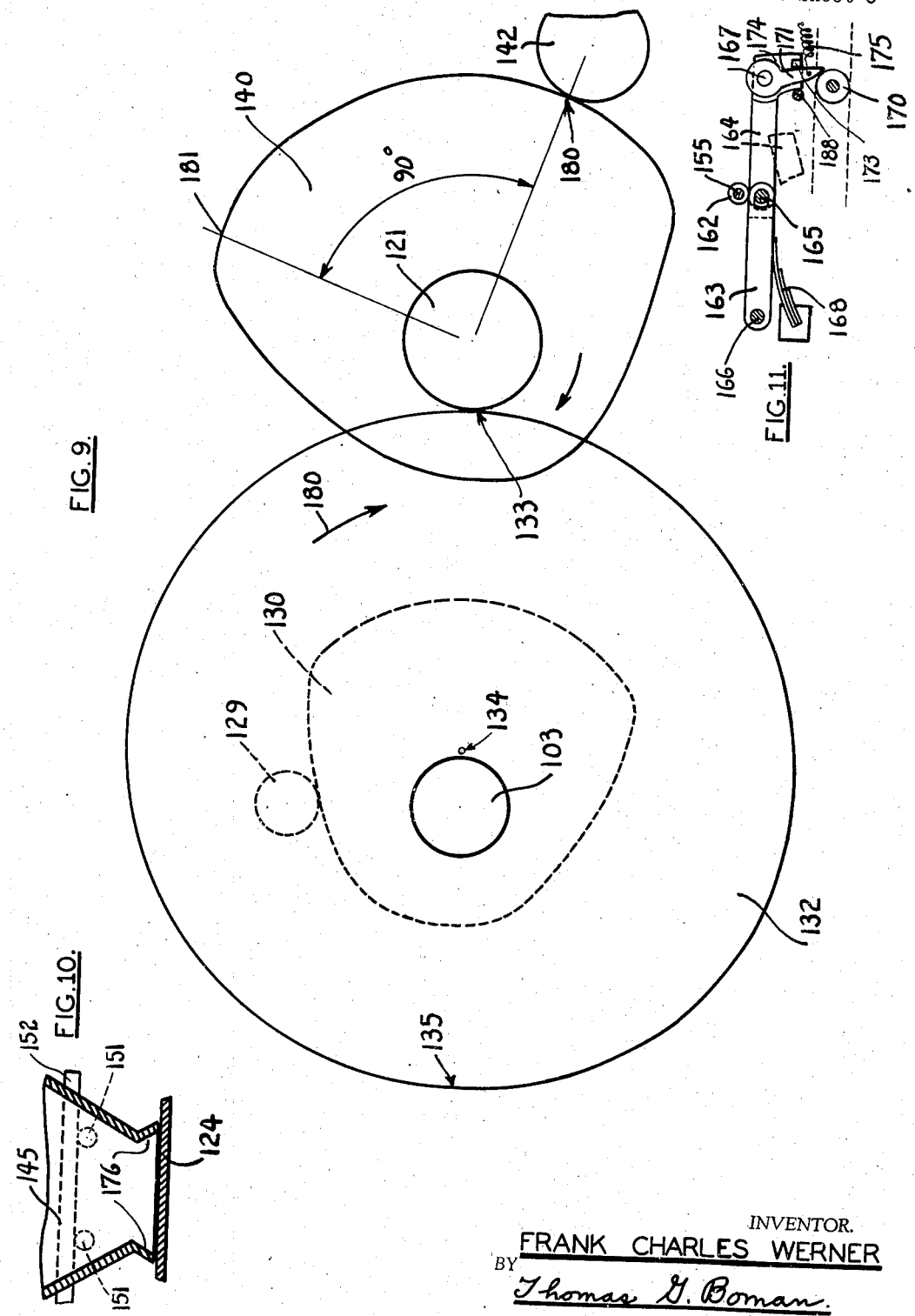

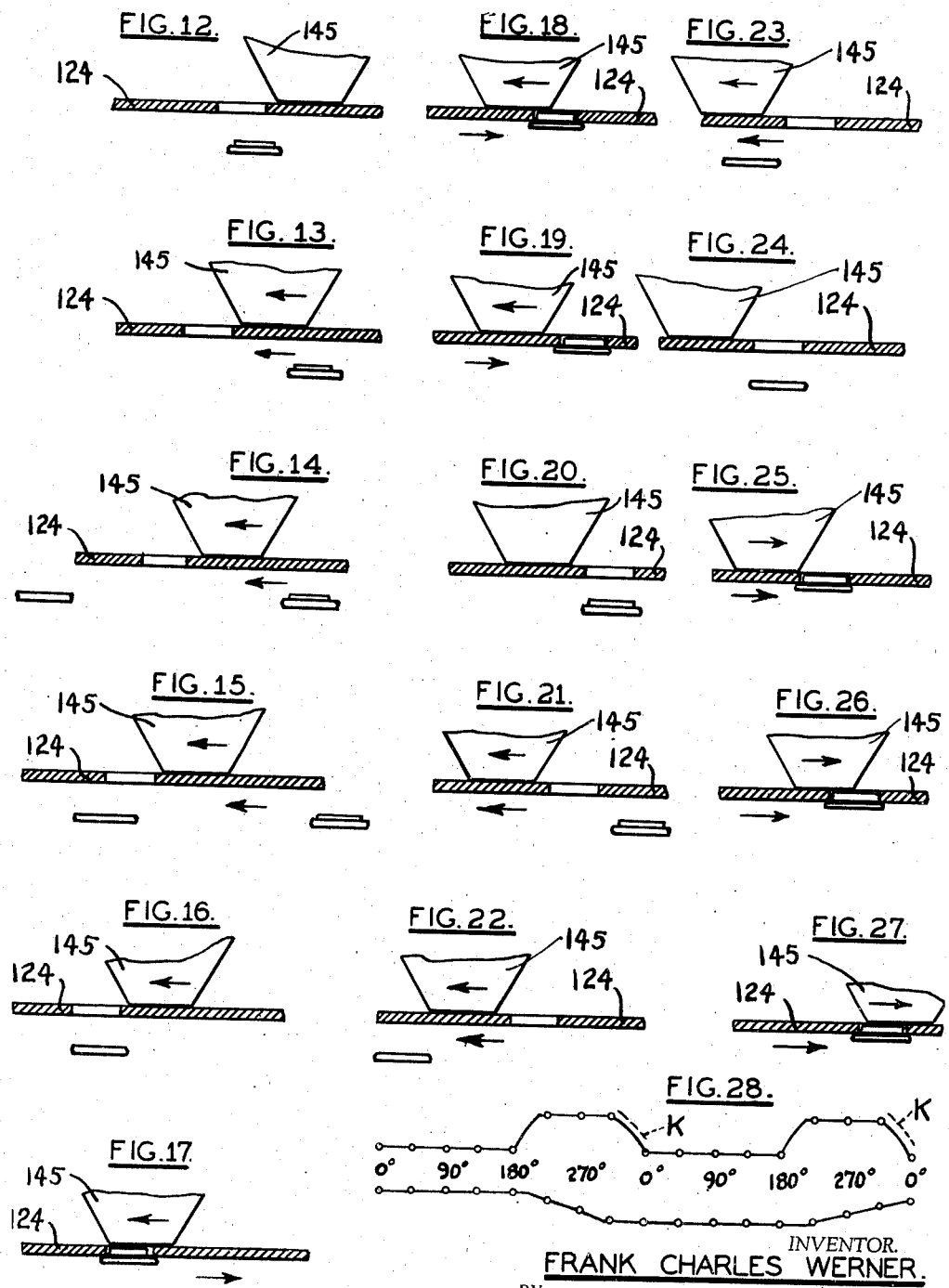

Patented July 2, 1940

2,206,313

UNITED STATES PATENT OFFICE 2,206,313

SANDWICH COOKY MACHINE

Frank Charles Werner, Grand Rapids, Mich.

Application November 1, 1939, Serial No. 302,330

17 Claims. (Cl. 107—27)

This invention relates generally to cooky machinery and more particularly to means for properly positioning two cookies, applying icing, confection, or the like, upon one of these cookies, and then assembling the other cooky thereupon in exact relationship whereby a sandwich type of cooky is produced.

Cookies, as sold in retail stores, are of various forms. They may be of a plain form containing only a single cooky or wafer, either with or without a frosting or other confection applied thereto. Other cookies are of the sandwich type in which two cookies are located, one over the other with a confection filling between.

The present invention has for one of its primary objects and purposes the production of a practical and efficient machine for producing cookies of the sandwich type in large quantity production at a rapid speed and in a continuous process so that a very practical and economical production of the sandwich cookies is obtained.

One feature of the present invention lies in my moving hopper arrangement whereby the same and the cooky therebelow are relatively stationary during the application of the filling material. And, the reciprocation of the hopper causes agitation and stirring of the mixture therewithin thus aiding in its downward flow and also giving a desirable uniformity of mixture.

Another feature is my provision of means under the belt for raising the particular cooky which is to receive the confection at the proper time in the sequence of operations whereby the cooky is immediately under the applying nozzle or opening in the stencil plate.

And, another advantage along this same line, is that I provide interconnecting driving means between the belt raising means and the stencil plate of the hopper arrangement whereby these elements, one being below the belt and the other one above, travel at exactly the same speed thus assuring ease and positiveness of operation.

And, I provide cam means for moving the above contacting attachments at exactly belt speed for the necessary part of their cycle.

Another feature is the novel combination of the hopper driving means, shown as a cam, upon the stencil plate driving means, this diminishing the dimensions of the movements required with respect to the driving means as the cam. Thus a better and faster running machine is had. As a matter of fact, the machines of this type which are on the market today, run at a maximum speed of 45 R. P. M. whereas my machine will operate at 80 R. P. M.

Yet another feature lies in my novel means for pushing the cookies out of the stencil plate openings after the confection has been applied thereto.

Other objects, advantages and meritorious qualities reside in the special construction, combination and arrangement of the various elements forming the invention, as more fully hereinafter described and claimed, reference being had to the accompanying drawings forming part hereof, wherein:

Fig. 2 is a fragmentary enlarged section from front to rear of the machine, the plane of the section being substantially on the line 2—2 of Fig. 4, looking in the direction indicated by the arrows.

Fig. 8 is a side view, similar to Fig. 2 and somewhat diagrammatic, of the preferred modification of my machine.

Fig. 9 is a side view, enlarged so as to be one-half the actual size of the cams, somewhat diagrammatic, showing the cams in their associated relationship.

Fig. 10 is an enlarged fragmentary view in cross section through the bottom part of the confection hopper.

Fig. 11 is a fragmentary side view illustrating the action of the control means for the means which pushes the coated cookies downwardly with the belt.

Fig. 12 is a diagrammatic view showing the positions of the hopper, the stencil plate and the cooky when the parts are positioned as in Fig. 8.

Fig. 13 is a view similar to Fig. 12, the cams which operate the stencil plate and the belt lifting device, being advanced clockwise one-eighth turn. The hopper cam, being driven at half speed, advances one-sixteenth turn in the opposite direction.

Figure 1:
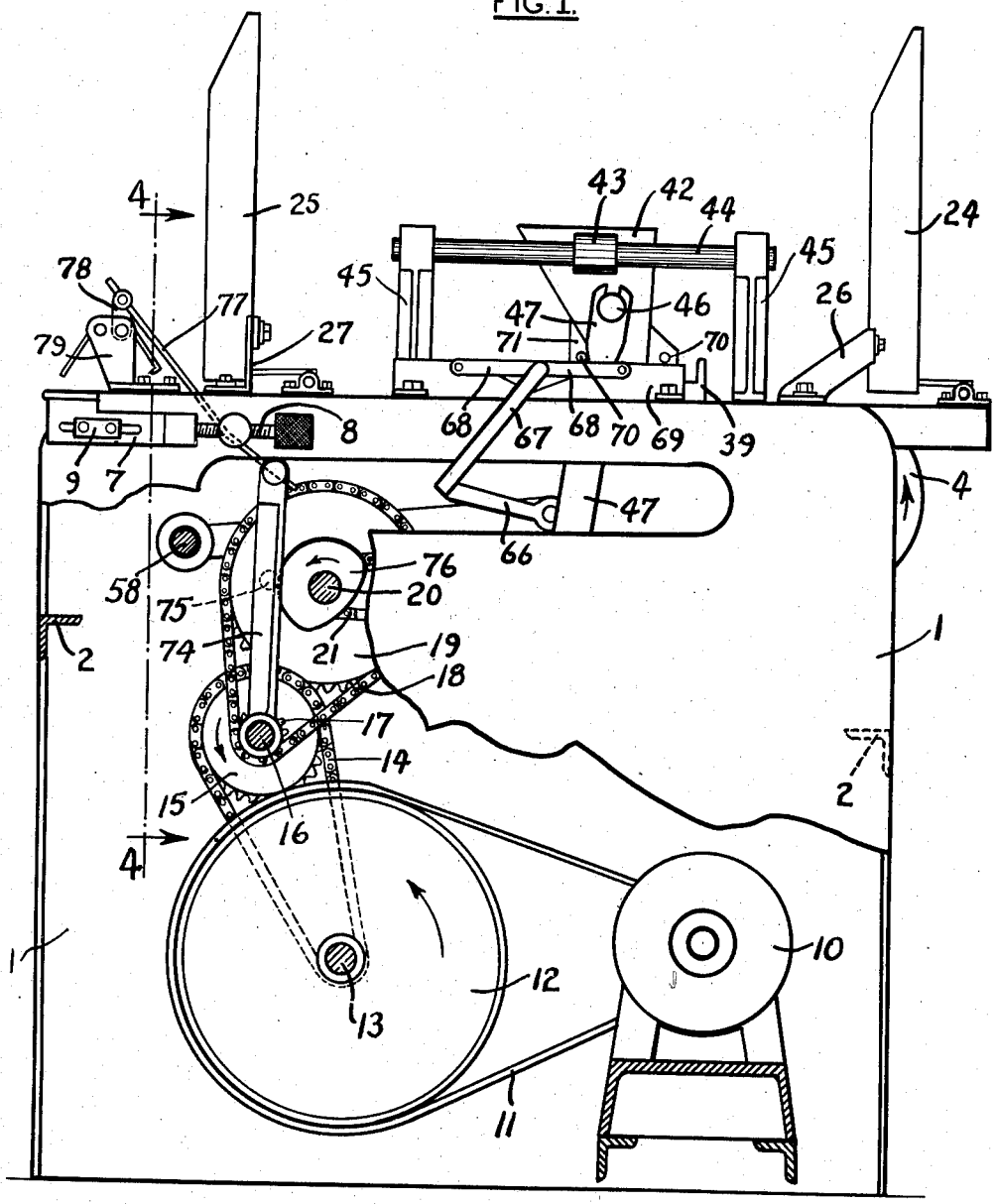
Fig. 1 is an elevation of the machine with one of the supporting sides thereof partly broken away for better illustration of the structure, and with various shafts of the machine shown in section.

Figs. 14 to 27, inclusive, indicate, consecutively, the several positions of the hopper, stencil plate and cookies, as the cams are rotated through similar continuing steps.

Fig. 28 is a diagrammatic view illustrating the timed relationship of the belt and cooky raiser, the across opening movement of the hopper and the downward movement of the means for pushing out the coated cookies.

Like reference characters refer to like parts in the different figures of the drawings.

In the construction of the machine, as made in accordance with my invention, spaced apart vertical supporting members 1, connected by horizontal cross bars 2, among other connections, form the supporting frame of the mechanism. At what may be termed the front of the machine and at the upper front corners of the supporting members 1, a horizontal shaft 3 is mounted, on which is a drum 4. An endless belt 5 passes around the drum 4 and near the opposite or rear end of the machine over and underneath a cross bar 6, the ends of which are connected with brackets 7, see Fig. 1, adjustably mounted at the outer sides of the members 1 and adapted to be adjusted by screws 8, the brackets preferably being slotted as shown, and with fastenings 9 passing through the slots for securing said brackets into any position to which adjusted, and whereby the belt may be tightened to the proper degree. The upper run of the belt is in a horizontal plane extending from the upper side of the drum 4 to and over the upper side of the plate 6.

Figure 4:
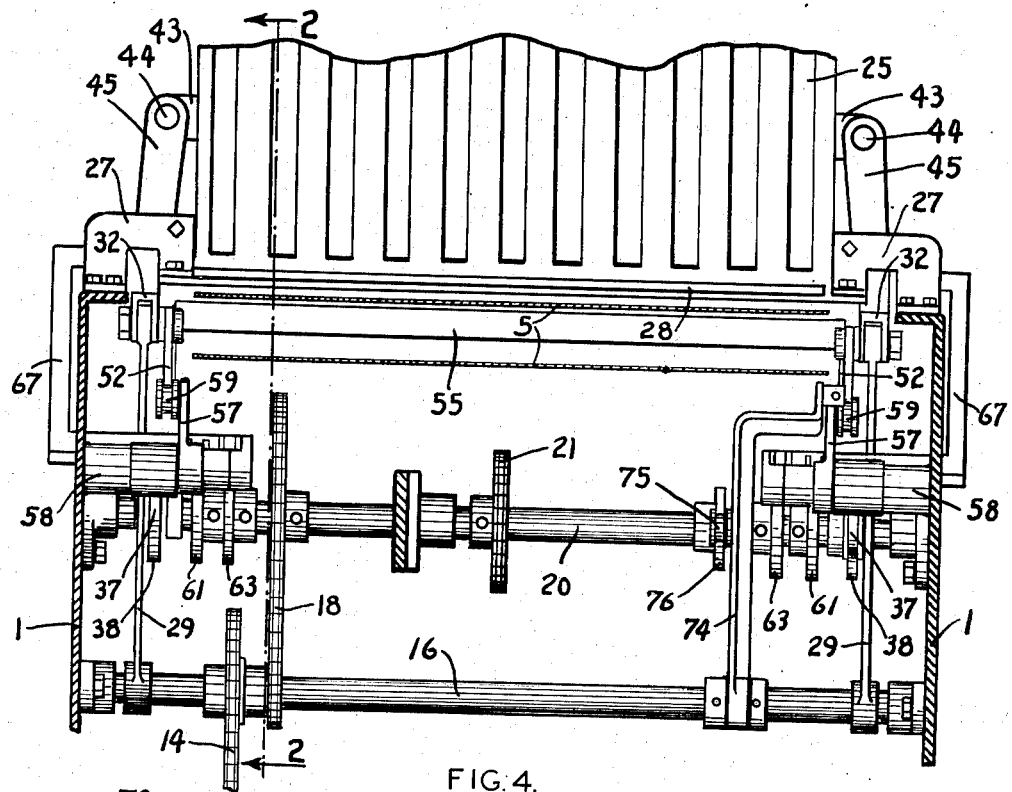
Fig. 4 is a fragmentary transverse section substantially on the plane of the line 4—4 of Fig. 1, looking in the direction indicated.

The power to operate the machine is supplied, for example, by an electric motor 10, though of course any other equivalent prime mover or source of power may be used. Through a belt or chain 11 a pulley 12, mounted on a shaft 13, is driven by the motor 10, see Fig. 1, and on the shaft 13 a smaller pulley drives a chain 14 which goes around and drives a sprocket wheel 15 on a shaft 16 which extends between the sides of the machine, as best shown in Fig. 4.

Figure 3:
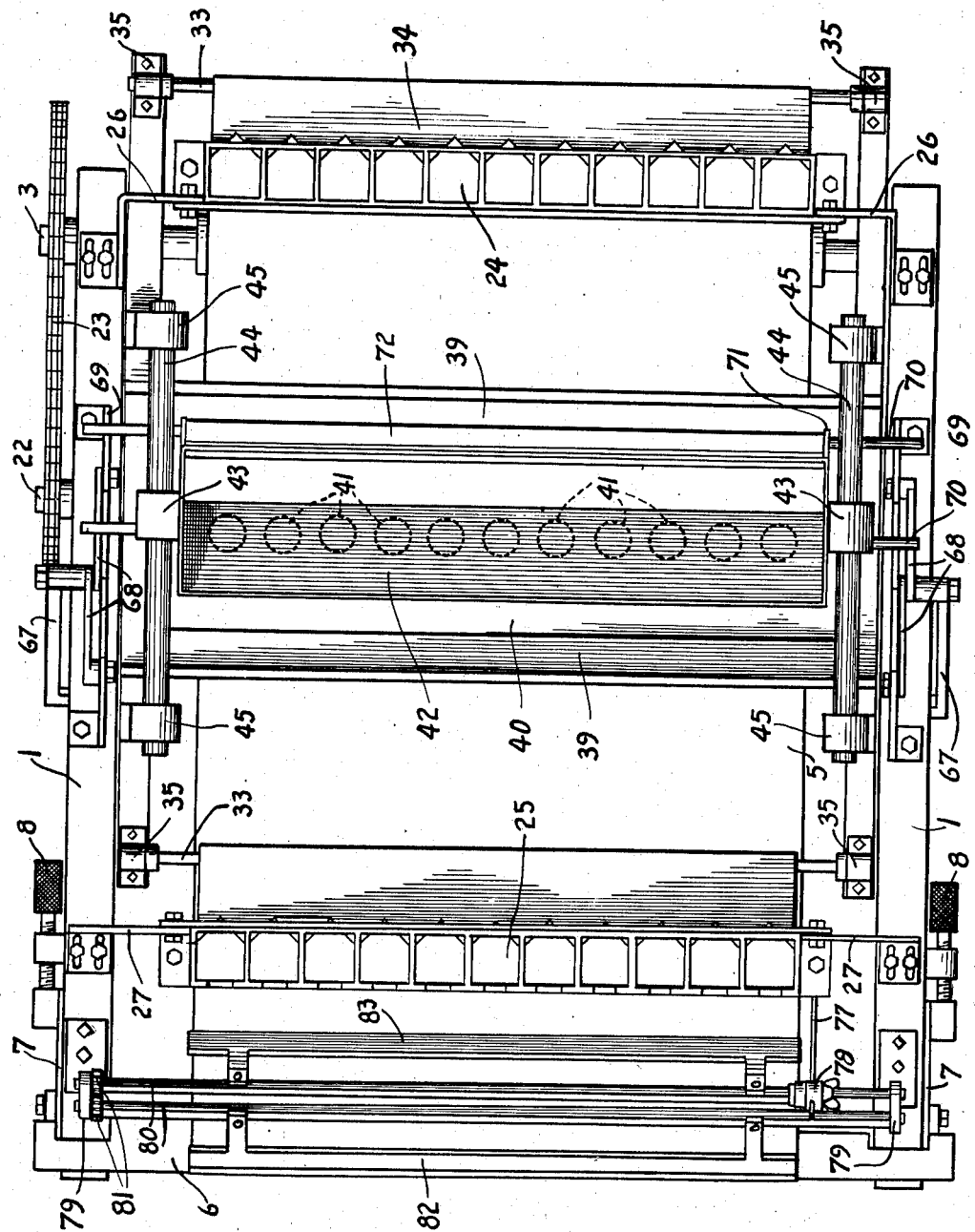
Fig. 3 is a plan view of the machine.

The shaft 16 has a smaller sprocket wheel 17, driving a chain 18, which goes around and drives a large sprocket wheel 19 on another horizontal shaft 20 which likewise extends between and is mounted at its ends in bearings at the inner sides of the members 1. The shaft 20, in turn, through a suitable sprocket wheel thereon, drives a chain 21 which goes around a suitable sprocket wheel on a third horizontal shaft 22, located substantially at the same vertical height as the shaft 20, see Fig. 2, and which shaft 22 extends through at least one of the members 1 of the machine, see Fig. 3, and with a suitable sprocket wheel thereon and one likewise on the same end of the shaft 3 drives said shaft 3 and drum 4 thereon through the chain 23, as shown in Fig. 3. It is evident that there is a very marked reduction in speed so that the motor 10 may be rotated at high speed, rotating the shaft 3 at a lower speed. The shaft 22 is driven at exactly twice the speed of the shaft 20 as will be explained later together with the reason therefor.

Adjacent the front end of the machine and slightly forward of the belt is a vertical magazine 24 in which cooky wafers are placed one on top of the other. The magazine at its lower end is closed and is at a plane above the upper run of the belt 5, being supported by suitable brackets 26, see Fig. 1, bolted to the members 1. Similarly, a short distance from the rear of the machine, a vertical wafer carrying magazine 25 is mounted by supporting brackets 27 similarly bolted to the side members. Each of the magazines is divided by partitions, as best shown in Fig. 3, into vertical compartments, shown as eleven in number, though the number may be varied, and in each compartment a stack of superimposed cooky wafers are to be placed.

Each of the magazines, at both its front and rear side and immediately above the closing bottom is horizontally slotted, the height of the slot being such that one wafer at the bottom of each of the stacks may be pushed rearwardly through the rear slots 28 and drop onto the upper run of the belt 5, this occuring with the cooky wafers in the magazine 24, or onto a wafer to which a confection filling has been applied at its upper side, this occurring with the wafers in the rear magazine 25.

Two substantially upright bars 29 are pivotally mounted at their lower ends on the shaft 16, paralleling which and toward the front of the machine are similar upright bars 30 which are pivotally mounted at their lower ends on a shaft 31 located at the same height as the shaft 16. At the upper ends of the parallel bars thus provided is a frame including two horizontal bars 32, which at their rear ends are pivotally connected to their upper ends of the bars 29 and at a distance back of their front ends are similarly pivotally connected to the upper ends of the bars 30. See Fig. 2. The bars 32 extend forward a distance in front of the front magazine 24. Rods 33, each provided with a horizontally extending ejector plate 34, are mounted in brackets 35, one pair of said brackets, which carries the front rod 33, being located at and above the front ends of the bars 32 and the other above and at the rear ends of said bars 32. The ejector plates 34 are located in a horizontal plane such that their rear edges extend into the slots in the front sides and immediately above the bottoms of the magazines 24 and 25.

Normally the bars 29, 30 and 32 and ejector plates 34 are drawn to a forward position by relatively heavy tension springs 36 connected to the bars 30 at one end and to the members 1 of the frame of the machine at their other ends. The bars 29, at points immediately back of the shaft 20, are provided with rollers 37, see Fig. 4, which rollers bear upon cams 38 mounted on and rotatable with the shaft 20, see Fig. 7, whereby with each revolution of the shaft 20 there is a complete reciprocation of the horizontal bars 32 and a consequent rearward movement and ejection of the bottom wafers in the stacks of wafers in the magazines 24 and 25 and a return of such of the ejector plates 34 to front position.

Figure 7:
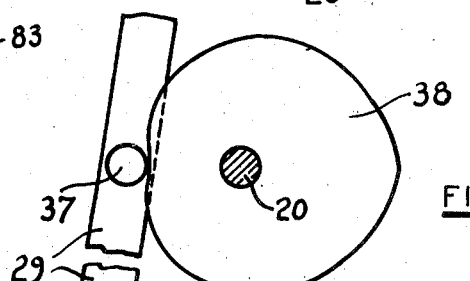
Fig. 7 is an enlarged side view of the cam which operates to reciprocate the stencil plate and its appurtenances.

The cams 38 are shaped as shown in Fig. 7 whereby they give a constant speed to the frame 32 and its appurtenances.

At a point between the position of the wafer magazines 24 and 25 a relatively heavy frame 39 is mounted on and extends transversely between the bars 32, being permanently secured thereto, and between the longitudinal members of the frame 39 a flat metal plate 40 is secured, closing the frame opening, and in which are a plurality of openings 41, the number of said openings corresponding to the number of chambers in the wafer magazines. Therefore, eleven are shown in the present disclosure.

Figure 2:
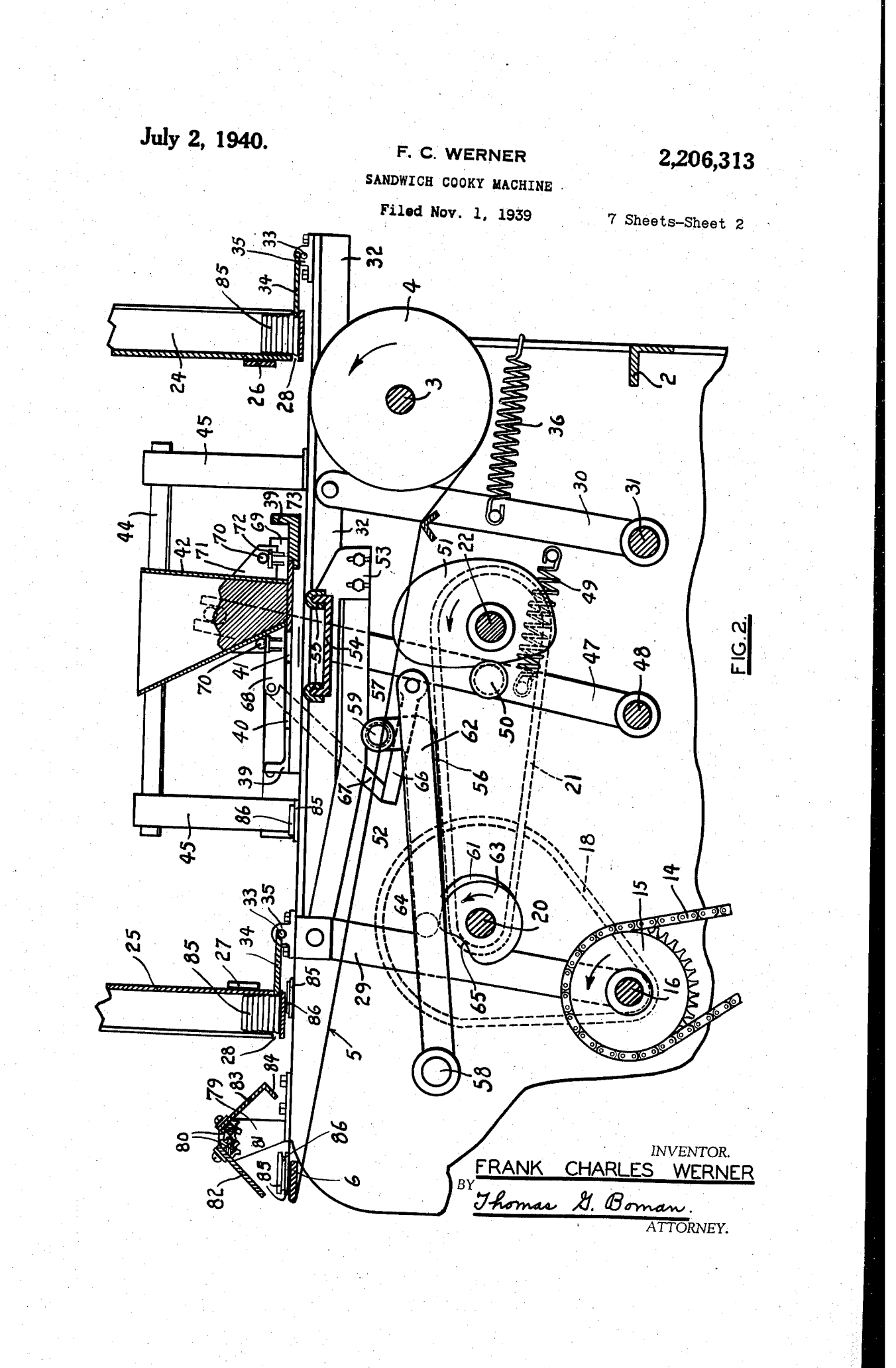

The upper run of the belt 5 passes a short distance below the lower side of the frame 39 and plate 40, as best shown in Fig. 2. A hopper 42 in which the confection filling, to go between the wafers of a sandwich cooky, is carried, is disposed above the plate 40 with its open lower end flush with the upper side of the plate so that the confection material therein rests against the upper side of said plate. See Fig. 2.

The hopper extends transversely across the machine and at each end carries a lug 43, each lug being slidably mounted upon a guide rod 44. The rods 44 are supported at their ends by vertical posts 45 which at their lower ends are carried by the frame members 32. It is evident that the support for the hopper, namely, posts 45, and rods 44, move with the reciprocations of the bars 32, and further that the hopper may have an independent sliding movement on the rods 44.

The hopper at each end, between its upper and lower sides, is equipped with a projecting trunnion 46, which trunnions 46 enter slots in the upper ends of levers 47 extending downwardly to and pivotally mounted upon a shaft 48 located at the same height as the shafts 16 and 31. See Fig. 2. Coiled tension springs 49 act upon the pivoted bars 47 to normally turn them clockwise and bring rollers 50 on said bars 47 against the edges of cams 51 fixed upon and rotatable with the shaft 22, it being evident that with each rotation of the shaft 22 the hopper 42 is moved back and forth on the rods 44, the character of the movement being governed by the shape of the cams 51 which are of the conformation shown in Fig. 2.

Bars 52 at one end are pivotally mounted on the same pivots which join the upper ends of the bars 29 with the rear ends of the reciprocating bars 32. Said bars 52 extend forwardly and downwardly at a slight angle for a distance and then horizontally forward underneath the plate 40. At their front ends they are equipped with brackets 53 which carry a shallow channel trough 54 having the flanges thereof extending upwardly. Said flanges are preferably covered with a cushioning covering 55, such as rubber. The member 54 extends transversely of the belt 5 and relatively close underneath its upper run.

The brackets 53 have a capability of a limited vertical adjustment so as to properly locate the channel member 54 with reference to the upper run of the belt 5.

Figure 6:
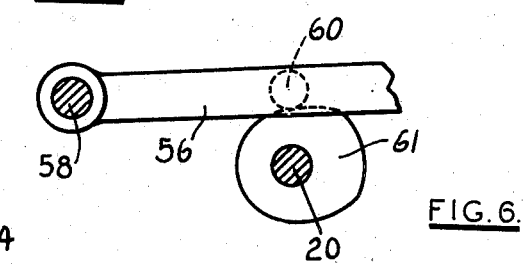
Fig. 6 is a fragmentary side elevation of the cam which operates to raise the belt supporting and raising means.

Bars 56, one at the inner side of each of the members 1 of the machine, are pivotally mounted at their rear ends on stud shafts 58, extend over the shaft 20 and at their outer ends have upturned extensions 57 on which are rollers 59, the lower edges of the bars 52 resting on said rollers. Where bars 56 pass over the shaft 20 they are equipped with rollers 60, see Fig. 6, which rollers ride upon cams 61 fixed on and rotatable with the shaft 20. The cams have a semi-circular peripheral outline and a rise such that when the rises of said cams come to the rollers 60, bars 56 are elevated a short distance, thereby lifting the bars 52 and channel member 54 upwardly and bringing the rubber coverings or facings against the underside of the belt 5, raising the belt 5 toward the plate 40.

Mounted on the same pivots 58 are other bars 62 which extend alongside of and substantially parallel to the bars 56, at their forward ends having connected thereto the bars 66 which extend backwardly for a distance and have rigidly connected therewith the upwardly and forwardly extending bars 67 which pass at the outer side of the supporting members 1 and at their upper ends are pivotally connected to links 68.

The links 68 at their inner ends are pivotally connected together and with the bars 67 and extend away from each other, and at their outer ends have a pivotal connection to vertical plates 69 which are downwardly recessed at their middle portions and at their upper sides. These plates are fastened to the upper edges of the supporting members 1 as shown in Fig. 3. The upper edges of the plates 69 and of the bars 68 are in the same horizontal plane when said links 68 are in alinement as in Fig. 1.

Rods 70 are positioned horizontally and are adapted to rest upon the upper edges of the plates 69 and links 68, and are guided in vertical slots in guide plates 71 secured one at each end of the hopper 42. Flat bars 72 are permanently secured with the rods 70 from which bars pins 73 extend downwardly, there being a set of pins 73 for each of the eleven openings 41 in the plate 40. The guide plates 71, rods 70 and the bars 72 with the attached pins, move with the hopper. It is evident that when the rollers 64 reach the recesses 65 in the cams 63, the links 68 are moved downwardly at their pivotally connected ends. And in practice the connection of the links at their outer ends to the plates 69 is by pivot and short slot connection which will permit such downward movement. The rod 70 which is over any part of the links 68 will follow the links in a downward direction by gravity.

A bent bar 74 is pivotally mounted on the rod 16, see Figs. 1 and 4, and extends upwardly and laterally, as shown in Fig. 4. The bar carries a roller 75 which bears against a cam 76, see Fig. 1, mounted on and rotatable with the shaft 20. At its upper end a rod 77 is adjustably connected thereto and extends upwardly and to the rear and at its upper end is connected with an arm 78, see Fig. 1, the rocking of which serves to actuate the cooky evener construction.

Figure 5:
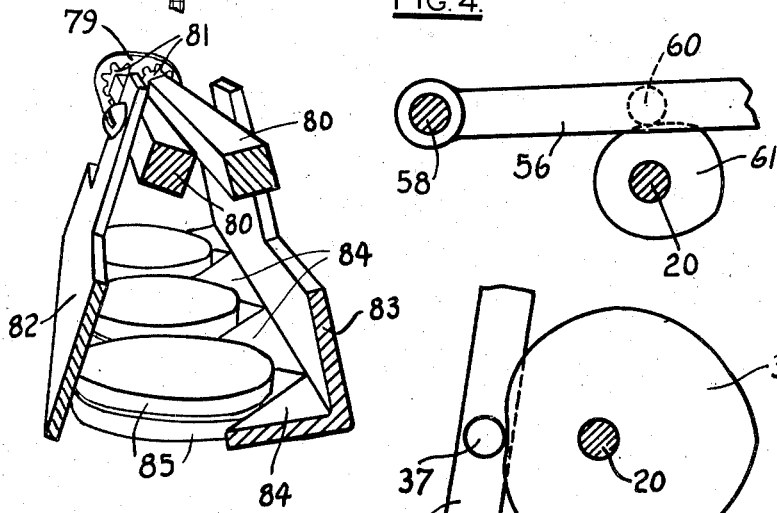
Fig. 5 is a fragmentary enlarged perspective view of a detail of structure of the machine which performs the last or evening operation upon the sandwich cookies, that of properly locating the upper and lower wafers of each cooky with respect to each other.

Such evener construction includes two vertically positioned spaced apart brackets 79 bolted to the upper rear corner portions of the supporting members 1, and between which two rock shafts 80 extend and are rotatably mounted, the arm 78 being connected to one of said shafts. Pinions 81 on the shafts are in engagement, see Figs. 2 and 5, so that the rocking of one shaft rocks the other simultaneously and in the opposite direction. A plate 82 is connected to one of the shafts 80 and a second similar plate 83 to the other shaft, said second plate at its lower edge being provided with a plurality of inwardly turned consecutive triangular shaped teeth 84. When the arm 80 is rocked in one direction the plates 82 and 83 are separated and when rocked in the opposite direction are brought together. The weight of the plates 82 and 83 tends to move said plates downwardly toward each other when the roller 75 reaches the proper position on the cam 76, that is, that edge of the cam shown in Fig. 1 nearest the shaft 20; and said plates are moved apart when the rotation of the cam brings the other edge of the cam concentric with the shaft 20 to said roller.

In operation the several vertical chambers of the magazines 24 and 25 are filled with cooky wafers 85 located one over the other. With the motor 10 driving the mechanism, the bars 32 are reciprocated back and forth by the cams 38 bearing against the rollers 37 and with the springs 36 being stretched and retracting so that the bars 32 make a complete reciprocatory movement with each rotation of the shaft 20. The heart-shaped cams 38, when driven at a constant speed, cause the bars 32 to move along with the belt, during one part of their cycle, at the same speed as the belt. Thus the belt, its raising means thereunder, and the plate thereabove are relatively stationary for a certain interval.

Under such movement the lowermost cooky wafer 85 in each of the vertical compartments of the magazine 24 is pushed out of the magazine onto the belt 5 so that a row of wafers extends across the belt, 11 in number in the disclosure shown, is deposited and moves with the belt which is running at a continuous speed. Said wafers are brought underneath the openings 41 in the plate 40 at a time when, through the operation of the various cam and spring controlled drives of the frame 39 and the hopper 42, the lower end of said hopper is at one side of said openings 41; and the channel member 54 has been lifted against the upper run of the belt 5 to lift the wafers upwardly so as to come into close proximity to or engagement with the underside of the plate 40.

Then, as the presser channel member 54, the belt 5, the wafers, frame 39 and plate 40 move along lengthwise of the machine, the hopper moves from the forward side of the plate 40 to the rear side and hence across the openings 41. The filling material in the hopper 42, either of its own weight or by reason of a weight which may be placed above it, or by reason of an agitator therein, passes into said openings 41, filling the same and coming against the upper sides of the wafers 85. Then as the channel member 54 is lowered the links 68 are likewise lowered and a rod 70 with plate 72 and pins 73 moves downwardly, the pins passing through the filling shown at 86 above them downwardly and keep them in contact with the belt, the wafers with the fillers 86 thereon moving with the belt to the rear of the machine, and underneath the magazine 25 so as to be in a position to receive the lowermost wafers in the several vertical chambers in the magazine 25 when the ejector plate 34 associated with such magazine is rearwardly moved, thus depositing upper wafers 85 upon the filling 86.

The completed cookies are then passed to the evener mechanism wherein the two plates 82 and 83 are brought toward each other, the plate 82 evening and properly locating the upper wafers with respect to the lower wafers, and the recesses between the teeth 84 engaging the cookies and positioning them properly in transverse relation to the belt. The plates 82 and 83 are then automatically separated by the action of the cam 76 and the row of completed cookies extending transversely of the belt is delivered from the belt as it passes around the edge of the bar 6.

The movements of the frame 39 and plate 41 and of the hopper 42 are controlled by the several cams, levers and springs which operate them, so that the hopper at its lower end passes across the openings 41 to one side thereof, when depositing filling on one of the series of the wafers, and then to the other side when depositing filling on the next series of wafers, and the ejector rods 70, with the ejecting pins 73 thereon, operate alternately, one rod only being above the downwardly movable links 68 at the time when said links are thus lowered. The filling material passes from the hopper into the openings 41 with each passage of the hopper over said openings. The frame 39 and plate 41 moves with the bars 32. The hopper has an independent movement controlled by the cams 51 and the design of the cams and the timing of the movements is such as to secure the operations described.

At the time that the belt is elevated by the member 54 to bring the wafers against the plate 40, the movements of said belt and plate synchronize. The hopper moves and its lower end travels across the openings 41 at such times of synchronized movement of the belt and plate 40, depositing the filling in the openings 41.

That is, the bars 32 with the frame 39 and plate 40 moving to the left, see Fig. 2, and in the same direction as the upper run of the belt, the belt is lifted by the channel member 54, the lower wafers of the sandwiches brought upwardly against the plate, and the plate and belt are both moved to the left, see Fig. 2, at equal speeds. At this same time the hopper is moved to the left faster than the plate 40 moves, its lower end crossing the openings 41 and depositing the filler therein. The hopper may continue its movement at the left of the openings 41 while the frame 39 and plate 40 reaches the end of movement and returns, the hopper thereupon still being at the same side of the openings 41. Then on the following movement of the frame 39 and plate 41 in the same direction as the upper run of the belt, the hopper moves back to its original position, crossing the openings 41 at its lower end when the next succeeding line of wafers is again lifted upwardly at the underside of the openings 41 and are moving with the belt in synchronism with the movement of the plate 40.

And in one case one of the rods 70 with its ejecting device is lowered to push the cooky wafers with the fillers above downwardly and keep them in contact with the belt, and in the other case the other rod 70 and bar 72 with its ejecting pins operate.

Referring now to Figs. 8 to 11, numeral 100 indicates spaced side frames carrying cross shafts 101, 103 and 104.

A pair of swinging arms 120, only one of these being shown, are pivoted onto the shaft 101. These arms 120 are located inside of the side frames 100. A shaft 102 is carried by these arms 120 and a drive wheel 110 is attached thereto. A chain or the like 108 extends between the driving wheels 106 and 110.

The shaft 101 is the prime mover. A driving wheel 105 is affixed to the shaft 101 and this drives the shaft 103 through a chain 107 and a sprocket 109.

The sprockets or driving wheels 105 and 106 are the same size but the sprocket 110 is twice the size of the sprocket 109, this giving the shaft 103 twice the speed of the shaft 102.

The shaft 103, in turn, has a sprocket 112 with a chain 113 extending therearound and also around a sprocket 114 fixed to the shaft 104. Thus the shaft 104 is rotated.

The shaft 104 carries the driving roll 116 around which the belt 115 passes. The driving roll 116 has a small roller 117 positioned adjacent thereto as shown, the belt 115 passing over this smaller roll 117 in order to increase its wrap around the main driving roll 116. The belt 115 is continuous and has any suitable carrying means at its other end. (Not shown.)

The swinging arms 120 carry the shaft 102, as previously stated, and a cam follower or roller 121 is located on this shaft and the contact of this cam roller 121 against its cam controls the bodily movement of the swinging arms 120 together with their cross shaft 102 as will be readily understood as the description proceeds. It will also be understood that in my particular construction two sets of levers, cams and the like, are utilized, one set at each side of the machine, in order to secure a balanced construction, and best workable results in my construction. However, a single element construction, as set forth in the claims, is obviously covered by my invention and, for convenience in description, reference may be made to only a single unit whereas a double or duplicate unit may be used.

The upper ends of the swinging arms 120 are pivotally connected at 122 onto the frame 123, this frame 123 being slidably mounted upon the spaced side frames 100. The frame 123 carries the stencil plate 124. This stencil plate normally closes the bottom of the confection carrying hopper 145, see Figs. 8 and 10, and has a series of openings extending thereacross, these openings being in alinement with the row of cookies therebelow at the time when the openings are located directly below the bottom of the hopper.

The frame 123 extends completely across the belt and at its left end, see Fig. 8, at each corner thereof, has pivotally connected arms 125, these arms extending downwardly at each side of the belt to a plane therebelow, and carrying a channel member 126 which lies below and across underneath the belt. A soft rubber pad strip is located on the channel member 126 whereby the cookies, when they are pushed into contact with the underside of the stencil plate will be securely held thereagainst but not broken by their positive upward movement.

A pivoted bell crank lever 127, there being, preferably, an identical arrangement at each of the sides of the structure, has a roller 128 which contacts the underside of the arm 125. Also, the bell crank lever or levers, have a roller or rollers 129 as shown. A cam or cams 130, of the shape clearly shown in Fig. 9, in dotted lines, revolves with the shaft 103 and thus causes alternate raising and lowering of the channel 126 and the belt 115 thereabove. Thus the cooky or row of cookies are bodily carried upwardly to not only match the holes of the stencil plate 124 but also to have tight contact therewith whereby the confection is deposited in a cleancut configuration upon the cooky.

The shaft 103 also carries cams 132 attached thereto. Referring to only one of these cams and its associated elements, a point 133 of this cam 132 is shown in contact with the roller 121 previously mentioned. The point 133 is the high point of the cam. That is, the cam 132 has moved the roller 121, the swinging arm 120 and the frame 123, to which the stencil plate 124 is pivoted, farthest to the right. See Figs. 8 and 9. The periphery of the cam 132 upwardly and to the left of point 133 is a true semi-circle, its center being at point 134. This shape gives an easy return movement to the frame 123 and the stencil plate.

The point 135 is the low point of the cam. See Fig. 9. From point 135, anti-clockwise to point 133, the rise of the cam is sufficient to move the stencil plate 124 through the cam roller 121, the swinging levers 120, and the frame 123, a distance equal to the travel of the belt 115. The belt 115 is driven by the shaft 103, on which cam 132 is attached, through sprocket 112, chain 113 and sprocket 114. The cam is so shaped as to give a constant rise per unit arc or degree of circumference whereby the speed of the frame matches or equals the speed of the belt. This synchronizes the frame's movement and the belt's movement. And, although it is desirable that the shaft 101 be driven at a constant speed nevertheless this is unnecessary as any differential or variation in speed will be taken care of by the above described synchronization as both the belt speed and the stencil plate speed are direct functions of the speed of the shaft 103. In other words, both units are driven by the shaft 103 and thus their relationship remains constant.

The arms 120, there being an arm 120 alongside each side frame 100, carry the shaft 102, as previously stated, and this shaft, driven at one half the speed of the cam 132, carries a cam 140. This cam 140 is rotated clockwise at one half the speed of the cam 132.

A second pair of swinging arms 141 have follower rollers 142 riding upon the peripheral surfaces of the cams 140 and links 143, pivoted at 144 connect onto the ends of the hopper 145 as shown.

Springs 146 hold the arms 120 so that their followers 121 stay in contact with the cams 132 and a similar spring 147 maintains constant contact between the followers 142 and their cams 140.

The hopper 145 slides upon the stencil plate 124, being held downwardly thereagainst by rollers 151 thereon, these rollers riding underneath bars 152. The bars are rigidly attached to the frame 123. See Fig. 10.

A sleeve 153 is located at each corner of the hopper, each of these sleeves carrying a slidable plunger 154. A shaft 155 along one side of the hopper extends between the two alined plungers and a similar shaft 156 extends between the other two alined plungers. The shaft 155 has a bar 157 with pins 158 affixed thereto and the other shaft 156 has a similar bar 159 with pins 160. These pins are properly positioned so as to be directly above the several openings through the stencil plate at certain times in the cycle. At this time they are caused to descend by the several spring pressed plungers 154.

The ends of the two shafts 155 and 156, see Fig. 11, have rollers 162 thereon. Links 163 and 164, connected together by the pin and slot connection 165, are pivoted at their other ends at 166 and 167 onto the frame sides 100, the top surfaces of these links forming a track over which the rollers 162 operate. The toggle is held upwardly against the pressure of the several plungers 154 by the spring 168. And, the linkage structure is properly positioned so that the rollers 162 are directly above the openings in the stencil plate or rather in tranverse alinement therewith at the time when the cooky and filling are to be pushed out of the said openings.

At this time a roller 170, located upon the stencil plate frame, contacts a depending arm 171 swingable on the pivot 167 thus causing a lug 173 on the arm 174 integral with the link 164 to be moved to the right and thus cause the linkage to fold downwardly as indicated by the dotted lines of Fig. 11.

A stop pin 188 prevents excessive upward movement of the toggle, the stop pin being so located as to permit the links 163 and 164, these links forming the tracks for the rollers 162, to move only upwardly to a straight line position.

As shown at the left hand side of Fig. 8, a cooky magazine 200, supported by the cross piece 201, which, in turn, is carried by the side frames 100, carries cookies and these gravitate onto the plate 202.

The plate 202 has its top surface on a level with the top surface of the belt 115 which is to the right of the small roller 204. A pusher plate 205 slides above the plate or bar 202 and pushes the cookies onto the belt 115.

And, during this manipulation, the cookies neither rise nor fall due to the level positioning of the top surfaces of the bar 202 and the belt 115.

The pusher plate 205 has uprights 206, one at either end thereof, and rods 207 extend between the uprights 206 and the stencil plate frame 123, previously referred to. Thus the pusher plate 205 will travel at the same speed as the belt inasmuch as the stencil plate frame is driven at belt speed as previously described.

Thus the cookies are fed onto the belt at a rapid rate and, of equal importance, in a positive manner because the surfaces of the cooky contacts or meshes with the surface of the belt as the teeth on two meshing gears might sequentially come together. This is one of the features of my invention.

As previously stated, the stencil plate frame 123 carries a roller 170 which contacts the trip means shown in Fig. 11.

Thus, at the proper time, the "knock out" pins are operated. These push the several cookies with their filling out of the openings downwardly along with the belt.

Reference to Fig. 28 of the drawings shows two dotted lines K these indicating that the downward speed of travel of the knock out pins are synchronized with the downward travel of the belt.

It will be apparent that the size and shape of the swinging arm 171, see Fig. 11, controls the speed of the downward movement of the knock out pins.

A suitable spring 175 permits quick return of the roller 170 on its return movement without necessitating the quick return of the linkage. The major part of the linkage returns to position under the influence of the spring 168.

The hopper 145, see Fig. 10, particularly, may have one or both of its bottom edges outwardly flared in order to cause expedient entry of the confection into the several openings in the stencil plate 124.

Fig. 12 schematically shows the hopper, the stencil plate and the cooky as located when the cams are positioned as shown in Figs. 8 and 9.

Fig. 16 illustrates the several elements after the cam 132 has turned through half a revolution as indicated by the arrow 180. During this travel the stencil plate moves to the left and the cam 140, traveling from the point 180 to the point 181, has very little or practically no effect upon the relative motion between the hopper and the stencil plate and thus the hopper also moves to the left. Figs. 13, 14 and 15 indicate intermediate positions of the several parts.

The above movement are indicated in Fig. 28. The upper line indicates the up and down movement of the cooky and during the half circle movement just set forth the roller 129, see Fig. 9, travels to a diametrical opposite position with respect to the cam 130 and thus there is no raising of the cooky. That is, the top line of Fig. 28, from 0° to 180 remains in a lower plane. During the next 180° it will be evident that the roller 129 quickly rises to its full height, remains there for almost a half circle, then lowers again. This movement is repeated during the next revolution.

Two revolutions of the cams 130 and 132 are considered inasmuch as these travel at double the speed of the cam 140.

The lower line of Fig. 28 indicates the movements of the hopper cam which movements swish the hopper across the several openings and fill them with filling.

Fig. 17 illustrates a position of the cam 45° past the point 135. The frame 123, with its stencil plate, has begun its movement to the right, but the downward travel of the roller 142 along the cam 140 overcomes this movement and the hopper continues to move to the left. Figs. 18 and 19 illustrate a continuation of this movement.

Fig. 20 illustrates the several parts of cams 130 and 132 in their initial position. The following figures show the continuing movements through the next cycle, the hopper being moved across the openings in the opposite direction.

The machine described is one in which very rapid production of so-called sandwich cookies is obtained.

The present invention is a continuation in part of my application filed Jan. 3, 1938, Serial No. 183,057.

With the machine as thus constructed and with the continuous movement of the belt having no pauses in the operation of the machine, a much heavier production can be obtained; and at the same time my novel construction permits the speed of the machine to be very greatly stepped up thus giving a very material increase in production without having any appreciable spoilage of cookies.

The invention is of a very practical and useful nature. The claims appended hereto define the invention which is to be considered comprehensive of all forms of structure coming within their scope.

I claim:

1. The combination with a machine of the class described, having a supporting frame, an endless belt having a horizontal upper run mounted on said frame, means for driving the belt continuously at an even speed, wafer magazines located transversely of the belt, one adjacent one end of said upper run thereof and the other a distance from the opposite end of said upper run of the belt, and ejecting mechanism associated with each magazine and adapted to be periodically moved to eject the lowermost wafers onto the belt transversely thereof, of means movable back and forth above the belt and between said wafer magazines for supplying said first deposited wafers each with a filler on its upper side during a movement of said means in each direction, the wafers ejected from the second magazine being deposited upon the fillers above the first wafers as said first wafers with fillers thereon are carried by the continuously moving belt to and past the second wafer magazine, as and for the purposes specified.

2. The combination with a machine of the class described having a conveyor to carry cookies thereon, of means movable back and forth longitudinally of the conveyor and thereabove for depositing icing on said cookies while said cookies are moving and during a movement in each direction of said means, said means including horizontally reciprocating bars at each side of said conveyor, a plate having openings therethrough secured to said bars over said conveyor, and a hopper adapted to carry icing therein and deposit same on a cooky through an opening in said plate each time said hopper moves over an opening.

3. The combination with a machine of the class descibed having a conveyor to carry cookies thereon, of means movable back and forth lengthwise of the conveyor and thereabove for depositing icing on said cookies while said cookies are moving and during a movement in each direction of said means, said means including a plate having an opening therethrough movable for a short distance with said conveyor, and a hopper movable back and forth above said plate, said hopper adapted to carry icing therein and to deposit the same on a cooky each time it moves over said opening.

4. In combination, a conveyor, driving means therefor, a supporting element for the conveyor, mounting means for the supporting element whereby it may be moved to and from associated relationship with the conveyor, a driving structure between the said driving means and the supporting element for driving the supporting element for a certain period at the same speed as the conveyor and means for causing the supporting element to be moved upon its mounting means into associated relationship with the conveyor during this certain period.

5. A combination of elements as set forth in claim 4 in which the driving structure includes a cam having a constant speed portion.

6. In a machine of the class described, a moving belt, driving means therefor, an abutment movable into and out of engagement with the belt, means comprising a cam for moving the abutment at a speed equal to the belt speed for a part of its cycle and a second means for moving the abutment into and from belt contact during the interval of time during which the belt speed is equal to the abutment speed.

7. In a cooky machine construction, the combination of, a continuous belt, driving means for driving the same at a constant speed, an abutment, a first means for moving the abutment to and from contact with the belt, a second means for moving the abutment at belt speed and in the same direction, and means for rendering the first means effective while the second means is operative.

8. In a cooky machine construction, the combination of, a continuous belt, a shaft, a sprocket on said shaft, positive driving means between the sprocket and the belt, means for driving the shaft, a cam rigidly attached to the shaft, a pivoted lever having a cam roller spaced from its pivot contacting the said cam, and movable means on the lever located near the said belt, said cam having a portion of its roller actuating surface so formed as to cause the movable means to move at belt speed and additional means for moving the movable means toward or away from the belt as desired.

9. A combination of elements as set forth in claim 8 in which a stencil plate is located at the opposite side of the belt relative to the movable means, and a hopper is slidably positioned over said stencil plate.

10. The combination with a machine of the class described, having a moving conveyor to carry cookies thereon, of a discharge nozzle for confection or the like, said discharge nozzle being reciprocable back and forth along the belt, means for moving the nozzle at belt speed for a part of its stroke and means for opening and closing the said discharge nozzle while the said identical speeds prevail.

11. The combination with a machine of the class described having a moving conveyor to carry cookies thereon, of a stencil plate having a hole therein movably mounted above the belt to slide in parallelism thereto, means for driving the stencil plate so that its hole is relatively stationary with respect to the longitudinal movement of the belt, a hopper movably mounted upon the said stencil plate and means for moving the hopper.

12. A device for applying confection to a series of cookies spaced along a continuously moving belt, comprising a stencil plate having an opening therein, means for moving the stencil plate back and forth along the belt above the cookies with a portion of the same directional movement thereof being of the same speed as that of the belt, a confection supplying means, and means for moving the said confection supplying means in alinement with the said opening at that interval in the cycle when the opening and cooky are alined and traveling at the same speed.

13. A combination of elements as recited in claim 12 in which the confection supplying means is moved in one direction during a back and forth cycle of the stencil plate and in another direction during the next back and forth cycle of the stencil plate.

14. In combination, a moving belt for cookies, a sliding stencil plate thereabove, a hopper slidable above the stencil plate, driving means for the belt, reciprocating driving means for the stencil plate, and interconnecting means between the belt driving means and the reciprocating driving means whereby the stencil plate is driven at the same speed as the belt for a portion of its travel and in the same direction, and interconnecting means between the slidable hopper and the belt driving means whereby the hopper is reciprocated over the stencil plate but at one-half the cycle speed thereof.

15. A combination of elements as set forth in claim 14 in which the interconnecting means between the hopper and the belt driving means comprises a cam.

16. In combination, a belt, a reciprocable plate, having an opening, thereover, means for driving the belt and plate so that the opening is stationary with respect to the belt during a portion of its travel, said means including a moving element, a hopper reciprocable over the aforesaid opening, and a second means, associated with the first means comprising a member mounted upon the said moving element for reciprocating the said hopper.

17. In combination, a main frame, a stencil plate, having an opening slidable on said main frame, a hopper slidable over the stencil plate, means for reciprocating the hopper, means movable into the said opening and means actuated by movement of the stencil plate relative to the main frame for operating the said movable means.

FRANK CHARLES WERNER.